United States Patent
Shankaranarayana et al.

(10) Patent No.: US 12,032,607 B2
(45) Date of Patent: Jul. 9, 2024

(54) CONTEXT-BASED RECOMMENDATION SYSTEM FOR FEATURE SEARCH

(71) Applicant: Adobe Inc., San Jose, CA (US)

(72) Inventors: Sudhir Tubegere Shankaranarayana, Bangalore (IN); Sreenivas Ramaswamy, Bangalore (IN); Sachin Tripathi, Bengaluru (IN); Reetesh Mukul, Bangalore (IN); Mayuri Jain, Bangalore (IN); Bhakti Ramnani, Jaora District Ratlam (IN)

(73) Assignee: Adobe Inc., San Jose, CA (US)

( * ) Notice: Subject to any disclaimer, the term of this patent is extended or adjusted under 35 U.S.C. 154(b) by 301 days.

(21) Appl. No.: 16/876,624

(22) Filed: May 18, 2020

(65) Prior Publication Data

US 2021/0357440 A1    Nov. 18, 2021

(51) Int. Cl.
    *G06F 16/33*     (2019.01)
    *G06F 16/332*    (2019.01)
    (Continued)

(52) U.S. Cl.
    CPC ...... *G06F 16/3322* (2019.01); *G06F 16/3334* (2019.01); *G06F 40/284* (2020.01); *G06N 20/00* (2019.01)

(58) Field of Classification Search
    CPC .......... G06N 20/00; G06N 5/02; G06N 20/20; G06N 3/08; G06N 5/003; A61B 5/7267; G06F 16/24534; G06F 16/9024; G06F 2216/03; G06F 40/205; G06F 40/247; G06Q 30/00; G06Q 30/02; G06Q 50/01

USPC ................ 707/602–603, 608, 767, 797–798, 707/E17.011, E17.012, E17.05, E17.066, 707/E17.087, E17.173, E17.13

See application file for complete search history.

(56) References Cited

U.S. PATENT DOCUMENTS 7,152,229 B2 *  12/2006  Chong ...................... G06F 8/10
                                                                 717/146
7,512,612 B1 *   3/2009  Akella .................... H04L 51/52
(Continued)

OTHER PUBLICATIONS

"Bidirectional recurrent neural networks—Wikipedia", Retrieved at: https://en.wikipedia.org/wiki/Bidirectional_recurrent_neural_networks—on Mar. 2, 2020, 3 pages.
(Continued)

*Primary Examiner* — Tony Mahmoudi
*Assistant Examiner* — Linh Black
(74) *Attorney, Agent, or Firm* — FIG. 1 Patents

(57) ABSTRACT

A context-based recommendation system for feature search automatically identifies features of a feature-rich system (e.g., an application) based on the program code of the feature-rich system and additional data corresponding to the feature-rich system. A code workflow graph describing workflows in the program code is generated. Various data corresponding to the feature-rich system, such as help data, analytics data, social media data, and so forth is obtained. The code workflow graph and the data are analyzed to identify sentences in the workflow. These sentences are used to a train machine learning system to generate one or more recommendations. In response to a user query, the machine learning system generates and outputs as recommendations workflows identified based on the user query.

20 Claims, 6 Drawing Sheets

(51) Int. Cl.
*G06F 40/284* (2020.01)
*G06N 20/00* (2019.01)

(56) References Cited

U.S. PATENT DOCUMENTS

| | | | | |
|---|---|---|---|---|
| 9,569,729 | B1* | 2/2017 | Oehrle | G06Q 10/063 |
| 10,176,444 | B2* | 1/2019 | Favre | G06T 11/206 |
| 10,276,170 | B2* | 4/2019 | Gruber | G06F 3/167 |
| 10,713,258 | B2* | 7/2020 | Stetson | G06F 16/904 |
| 2005/0091338 | A1* | 4/2005 | de la Huerga | G07C 9/28 |
| | | | | 709/217 |
| 2006/0048093 | A1* | 3/2006 | Jain | G06F 8/20 |
| | | | | 717/104 |
| 2010/0010826 | A1* | 1/2010 | Rosenthal | G06Q 99/00 |
| | | | | 705/1.1 |
| 2010/0324927 | A1* | 12/2010 | Tinsley | G16H 50/20 |
| | | | | 707/723 |
| 2012/0191716 | A1* | 7/2012 | Omoigui | H01L 27/14647 |
| | | | | 707/E17.069 |
| 2013/0268258 | A1* | 10/2013 | Patrudu | G06F 40/40 |
| | | | | 704/9 |
| 2014/0201126 | A1* | 7/2014 | Zadeh | A61B 5/165 |
| | | | | 706/52 |
| 2015/0121378 | A1* | 4/2015 | Whyte | G06F 9/448 |
| | | | | 718/100 |
| 2015/0127565 | A1* | 5/2015 | Chevalier | H04W 4/21 |
| | | | | 705/319 |
| 2016/0321298 | A1* | 11/2016 | Negrea | G06F 16/90335 |
| 2017/0075877 | A1* | 3/2017 | Lepeltier | G06F 40/117 |
| 2017/0147709 | A1* | 5/2017 | Ganz | G06F 16/322 |
| 2017/0173262 | A1* | 6/2017 | Veltz | G16H 20/17 |
| 2017/0221240 | A1* | 8/2017 | Stetson | G06F 16/9024 |
| 2018/0025301 | A1* | 1/2018 | Paul | G06Q 10/0633 |
| | | | | 705/7.27 |
| 2019/0205792 | A1* | 7/2019 | Huang | G06F 9/4881 |
| 2019/0272296 | A1* | 9/2019 | Prakash | G06N 7/01 |
| 2019/0332667 | A1* | 10/2019 | Williams | G06N 5/022 |
| 2020/0167426 | A1* | 5/2020 | Scheideler | G06F 16/285 |
| 2020/0218858 | A1* | 7/2020 | Sawyer | G06F 40/279 |
| 2020/0227032 | A1* | 7/2020 | Toplyn | G06F 40/56 |
| 2020/0302564 | A1* | 9/2020 | Varga | G06F 16/24578 |
| 2020/0344185 | A1* | 10/2020 | Singaraju | G06F 16/9024 |
| 2020/0389495 | A1* | 12/2020 | Crabtree | G06F 16/2477 |
| 2020/0410392 | A1* | 12/2020 | Verma | G06F 9/453 |
| 2021/0019309 | A1* | 1/2021 | Yadav | G06F 16/2428 |
| 2021/0073654 | A1* | 3/2021 | Ameri | G06F 16/9536 |
| 2021/0117868 | A1* | 4/2021 | Sriharsha | G06F 16/2246 |

OTHER PUBLICATIONS

"Sebastianruder / NLP-progress", Retrieved at: https://github.com/sebastianruder/NLP-progress/blob/master/english/summarization.md—on Mar. 2, 2020, 21 pages.

Ganesan, "Opinosis: A Graph-Based Approach to Abstractive Summarization of Highly Redundant Opinions", Aug. 2010, pp. 340-348.

Tang, "End-to-end Learning for Short Text Expansion", Aug. 30, 2017, 9 pages.

* cited by examiner

CONTEXT-BASED RECOMMENDATION SYSTEM FOR FEATURE SEARCH

BACKGROUND

As computing technology has advanced computing devices have found many uses in our lives. Various different programs incorporating numerous features are available to users, such as photo editing programs, video editing programs, Web content authoring programs, and so forth. These programs typically have search systems that let users input search terms to find particular tools to use these features or search for help pages describing how to use these features.

While these search systems have their advantages, they are not without their problems. One such problem is that similar types of programs can be available from different developers that use different nomenclature for similar features. This makes it difficult for users accustomed to one program to know exactly what term to search for in another program. Similarly, novice users may be unaware of the appropriate names for different functionality. For example, a user may desire to lighten a photograph, but not be aware that the name of the tool the photo editing program has to allow an image to be lightened is named the "exposure tool." Accordingly, the user does not know to search for "exposure."

Conventional search systems include a static list of search terms associated with particular tools or help pages and can include different synonyms for terms that users are expected to search on. However, if developers do not expect a user to use a search term of "lighten" to find the exposure tool then the static list of search terms would not include "lighten" as a synonym for "exposure." Furthermore, oftentimes developers are continually modifying and upgrading their programs to add, change, or remove certain features, which results in needing the static list of search terms to be continually updated manually to add or modify synonyms for new or changed features, remove synonyms for removed features, and so forth.

These problems can result in users being unable to locate the tools they desire to use or locate help pages describing the features they need help with, leaving users frustrated with their programs and devices.

SUMMARY

To mitigate the drawbacks of conventional feature search systems, a context-based recommendation system for feature search is described. A code workflow graph for an application is generated. The code workflow graph includes multiple nodes each corresponding to a different function or method in the application, and each of the multiple nodes has an associated tag that is a name of the function or method. Data corresponding to the application is collected, the data can include, for example, social media data, analytics data, or help data for the application. Multiple paths in the code workflow graph that correspond to features of the application are identified. Each of the multiple paths includes two or more nodes of the multiple nodes. Tokens in the paths are identified, based at least in part on the data. These tokens are terms included in the tags associated with the nodes in the paths. A sentence is formed, for each of the multiple paths, that includes the tokens in the path in an order in which the tokens occur in the path. A machine learning system is trained, with the sentences formed from the multiple paths, to predict sentences in response to a user query.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
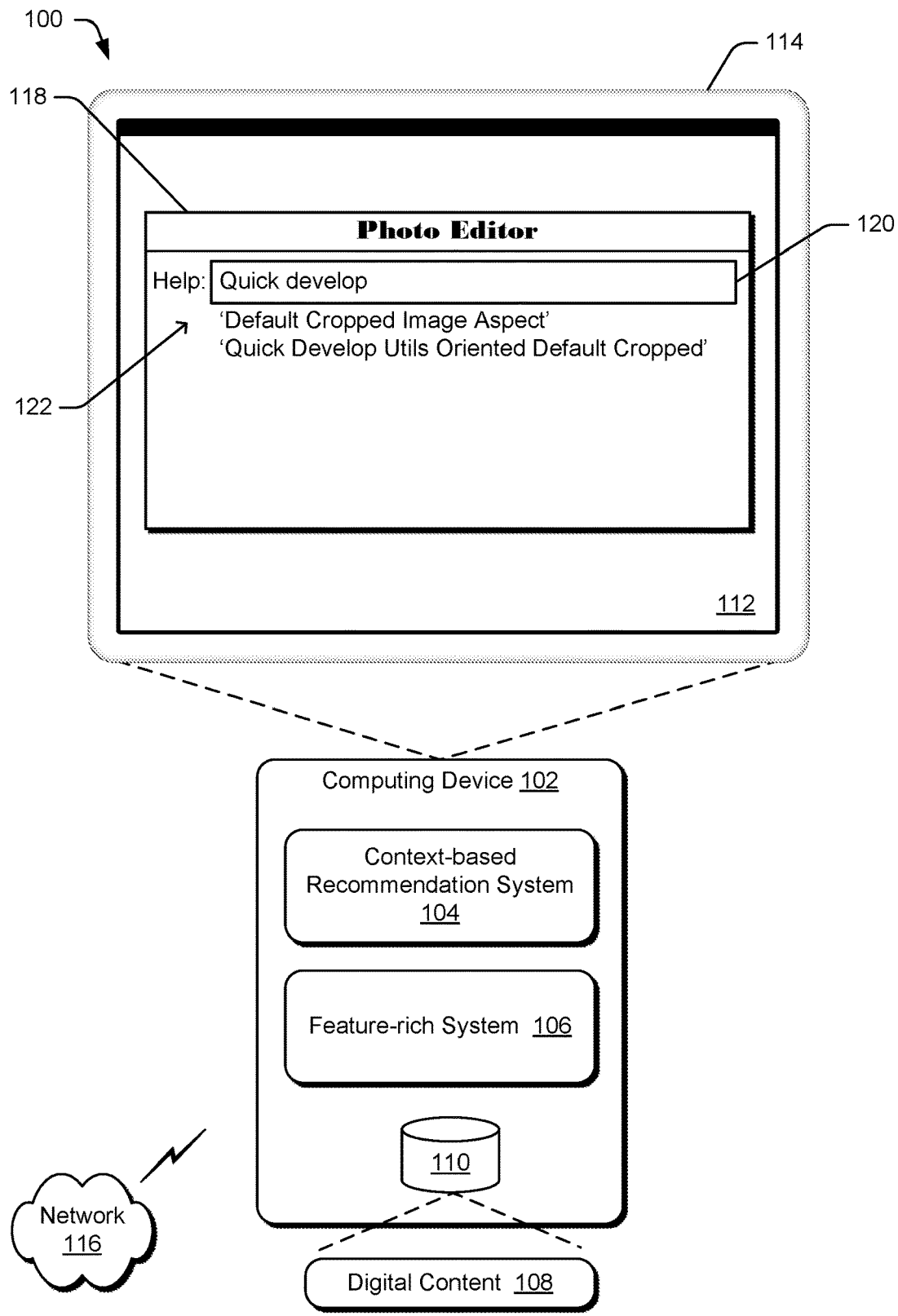
FIG. 1 is an illustration of a digital medium environment in an example implementation that is operable to employ the context-based recommendation system for feature search described herein.

Current solutions for searching for features (e.g., of an application) include a static list of search terms associated with particular tools or help pages. These solutions, however, can be problematic because they require accurate identification of the terms to include in the static list and further require continual manual modification of the list as developers add features to the application.

To overcome these problems a context-based recommendation system for feature search automatically identifies features of a feature-rich system (e.g., an application) based on the program code of the feature-rich system and additional data corresponding to the feature-rich system. Generally, a code workflow graph describing workflows in the program code is generated. Various data corresponding to the feature-rich system, such as help data, analytics data, and social media data is obtained. The code workflow graph and the data are analyzed to identify sentences in the workflows, which are sequences of terms included in the functions or methods of the workflows. These sentences are used to train a machine learning system to generate one or more recommendations. In response to a user query, the machine learning system generates and outputs as recommendations the sentences corresponding to workflows identified based on the user query.

More specifically, the feature-rich system includes program code, also referred to as a code base. The program code is converted into a format that is parsed to generate a code workflow graph. The code workflow graph is a directed graph of workflows in the program code. The code workflow graph includes multiple nodes, each representing a function or method in the program code that is invoked by another function or method. Lines between nodes indicate which functions or methods invoke which other functions or methods. Each node also has an associated tag that is the name of the function or method. Features of the program code are also identified and associated with workflows in the code workflow graph.

Various data corresponding to the application is also collected. This data can include help data for the feature-rich system, typically provided by the developer of the feature-rich system. For example, the help data can include data files that contain descriptions of the various features of the feature-rich system. The data can also include analytics data regarding usage of systems of the same type as the feature-rich system. This usage data can include, for example, the frequency of use of individual features of those systems, the duration of use of individual features of those systems, the order in which features are used, and so forth. The data can also include social media data, which refers to data obtained from various social media services, such as blogs dedicated to the same type of system as the feature-rich system (e.g., photography blogs if the feature-rich system is a photo processing system).

Sentences based on the code workflow graph and the collected data are generated. A sentence refers to a sequence of terms, also referred to as tokens, included in the functions or methods of a workflow. For example, a function name may be "AutoToneKeysForSettings," which includes the tokens "Auto," "Tone," "Keys," "For," and "Settings". For each node in the code workflow graph, the associated tag is separated into one or more tokens. The tokens for a tag are also associated with the same node as the tag.

Key words in the tokens associated with the nodes of the code workflow graph are also identified based on the collected data. The key words include, for example, tokens that match (e.g., are the same as) the words for these features in the collected data (e.g., the analytics data). By way of another example, the key words can include words commonly found in the collected data.

A set of paths through the code workflow graph is also generated. Each path corresponds to two or more nodes connected by one or more lines.

Tokens that are deemed to be unnecessary (also referred to as spam) are removed from the code workflow graph. Generally, if a token is occurring many times in the code workflow graph then that token is deemed to be unnecessary because it is too common in the code workflow graph to provide useful information when satisfying a user query. Removal of the tokens that are deemed to be unnecessary results in a reduced code workflow graph.

Additionally, certain paths are deemed to be more useful in searching for features than other paths. Accordingly, the reduced code workflow graph is pruned to remove paths deemed to be less useful in searching for features. Various different techniques can be used to remove paths from the reduced code workflow graph, resulting in a pruned code workflow graph.

In one or more implementations, a path weightage is assigned to each path and paths are removed based on their path weightages. The path weightage of a given path refers to how many other paths in the reduced code workflow graph include that given path. A path is removed if, for example, the path weightage of the path is not greater than a threshold amount.

Additionally or alternatively, paths can be removed based on whether the paths are asynchronous in nature. For example, whether a path is formed by making an asynchronous function or method call. In such situations paths that are asynchronous in nature are removed. Additionally or alternatively, paths can be removed based on whether the paths include nodes associated with different modules of the feature-rich system. In one or more implementations, paths that include nodes in two or more different modules are removed.

Sentences are generated from the pruned code workflow graph. Sentences are generated by identifying subgraphs in the pruned code workflow graph within a particular radius of a given node. This particular radius can be measured in tokens (e.g., the particular radius may be 20-30 tokens). The radius is measured by counting the number of tokens included in the paths. Nodes from which to identify a subgraph can be selected in a variety of different manners. In one or more implementations, a node having the largest number of connections (lines to other nodes) is selected and a subgraph is generated to include the nodes that are within the particular radius of the selected node. It should be noted that multiple tokens can be associated with each node so that although the radius may be measured in tokens the number of nodes in the subgraph can be less than the number of tokens (e.g., the radius may be 25 tokens but the number of nodes may be 6).

Once included in a subgraph, a node is excluded from inclusion in an additional subgraph. A remaining node having the largest number of connections (lines to other nodes) is then selected and another subgraph generated to include the nodes that are within the particular radius of the selected node. This process is repeated, resulting in multiple subgraphs.

Sentences are generated by generating a sequence of tokens that are associated with nodes along a path in a subgraph. The tokens are arranged in a sequence that is the same as the path, and for multiple tokens associated with a node the tokens are arranged in a sequence corresponding to the tag associated with the node. This sentence generation is performed for each path in the subgraph. It should be noted that situations can arise in which multiple paths exist between two nodes. In such situations, the sentence corresponding to the shortest path between the two nodes is kept, and the sentences corresponding to other paths between the two nodes are deleted.

The sentences are used to train a machine learning system to predict words that will follow a set of other words or predict what sentences are close to a user query. By identifying sentences from subgraphs centered around a particular node, these sentences close to a user query are more likely to be identified by the machine learning system. The machine learning system can be any of a variety of different machine learning systems. For example, the machine learning system can be implemented as a recurrent neural network, such as a Long Short Term Memory (LSTM) network or a Bi-directional Long Short Term Memory (Bi-LSTM) network.

After the machine learning system is trained a user query is received. The user query is provided to the machine learning system, which predicts what sentences are close to the context which the user has provided in the user query, and those sentences are output as recommendations to the user. The machine learning system predicts a probability of each of the workflows (e.g., based on the sentences of the workflow paths) being the answer to the user query. For each of one or more workflows, the sentence corresponding to the workflow is output as a recommendation.

The techniques discussed herein translate a user query into a query for the feature-rich system in real time. The user need not be familiar with the particular term he should be using to search in the feature-rich system. Rather, the techniques discussed herein allow recommended search terms to be displayed to the user despite his lack of familiarity with the proper terminology.

Additionally, the techniques discussed herein generate the recommendation based on the program code of the feature-rich system as well as collected data corresponding to the application. Accordingly, the recommendations are customized to the particular context of the feature-rich system, as indicated by the program code and the various collected data. For example, if the feature-rich system is a photo editing system, then the feature-rich system is within a photography domain and the recommendations are customized to the photography domain (e.g., in addition to being based on the program code, the recommendations are customized based on photography blogs, analytics data for photo editing systems, and so forth).

Term Descriptions

These term descriptions are provided for purposes of example only and are not intended to be construed as limiting on the scope of the claims.

The term "program code" refers to the set of instructions that make up a program. For example, the program code can be source code.

The term "feature" refers to functionality that a program exposes to the user. This functionality can be exposed as an operation or command that the user can select or otherwise input. For example, a feature may be importing a photograph, performing face detection in an image, altering the brightness of an image, and so forth.

The term "workflow" refers to a series of operations performed (e.g., functions or methods invoked in the program code) when performing the functionality of a feature.

The term "sentence" refers to a sequence of terms, also referred to as tokens, included in the functions or methods of a workflow. Each function or method can include multiple terms or tokens. For example, a function name may be "AutoToneKeysForSettings," which includes the terms "Auto," "Tone," "Keys," "For," and "Settings".

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the context-based recommendation system for feature search described herein. The illustrated environment 100 includes a computing device 102, which may be configured in a variety of ways. The computing device 102, for instance, may be configured as a mobile device (e.g., assuming a handheld configuration such as a tablet or mobile phone), a wearable device (e.g., augmented reality or virtual reality headsets), a camera, a laptop computer, a desktop computer, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 6.

The computing device 102 is illustrated as including a context-based recommendation system 104 and a feature-rich system 106. The context-based recommendation system 104 and feature-rich system 106 are each implemented at least partially in hardware of the computing device 102 to process and transform digital content 108, which is illustrated as maintained in storage 110 of the computing device 102. Such processing includes creation of the digital content 108 and rendering of the digital content 108 in a user interface 112 for output, e.g., by a display device 114. The digital content 108 refers to any of a variety of different types of digital content, such as image content, video content, audio content, and so forth. The storage 110 can be any of a variety of different types of storage, such as random access memory (RAM), Flash memory, solid state drive, magnetic disk drive, and so forth. Although illustrated as implemented locally at the computing device 102, functionality of the context-based sound 104 or feature-rich system 106, may also be implemented in whole or part via functionality available via a network 116, such as part of a web service or "in the cloud." Furthermore, although illustrated separately, the context-based sound 104 may also be implemented in whole or part by the feature-rich system 106.

The feature-rich system 106 includes numerous different features making it difficult to quickly and easily describe all functionality of the feature-rich system 106 to a user. For example, rather than a system that provides five or six features to a user, the feature-rich system 106 may provide 30, 50, 100, or even more features. E.g., the feature-rich system 106 may be a photo editing system that supports hundreds of different features, such as importing and exporting photos, modifying photos using different layers, blurring photos, sharpening photos, changing exposure levels of photos, transforming photos, and so forth. The context-based recommendation system 104 resolves this difficulty by implementing functionality to facilitate user searching for features of the feature-rich system 106 or help information describing features of the feature-rich system 106.

The feature-rich system 106 can implement any of a variety of different functionalities to process and transform digital content 108. In one or more implementations the feature-rich system 104 is a content creation system, such as an image or photo processing system, a video processing system, an audio processing system, a web content creation system, an application development system, combinations thereof, and so forth. These features can be implemented as one or more tools that can be accessed or invoked by the user in order to perform the corresponding functionality.

The context-based recommendation system 104 implements functionality to facilitate user searching for features of the feature-rich system 106 or user searching for help information describing features of the feature-rich system 106. As discussed in more detail below, the context-based recommendation system 104 receives a user query and provides the user query to a machine learning system that has been trained based on various different analytics data and the code base of the feature-rich system 106. The context-based recommendation system 104 outputs a search result, based on the user query, that is one or more workflows in the feature-rich system 106. Although illustrated as separate from the feature-rich system 106, the context-based recommendation system 104 can be implemented as part of the feature-rich system 106.

In the illustrated example, the feature-rich system 106 is a photo processing system displaying a photo editor window 118 in the user interface 112. The photo editor window 118 includes a help prompt with a text input field 120 in which a user has entered the user query of "Quick develop". In response, the context-based recommendation system 104 generates two workflows 122, illustrated as "Default Cropped Image Aspect" and "Quick Develop Utils Oriented Default Cropped", both of which can be user-selectable links taking the user to a particular tool or help page corresponding to the link.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Context-Based Recommendation System Architecture

Figure 2:
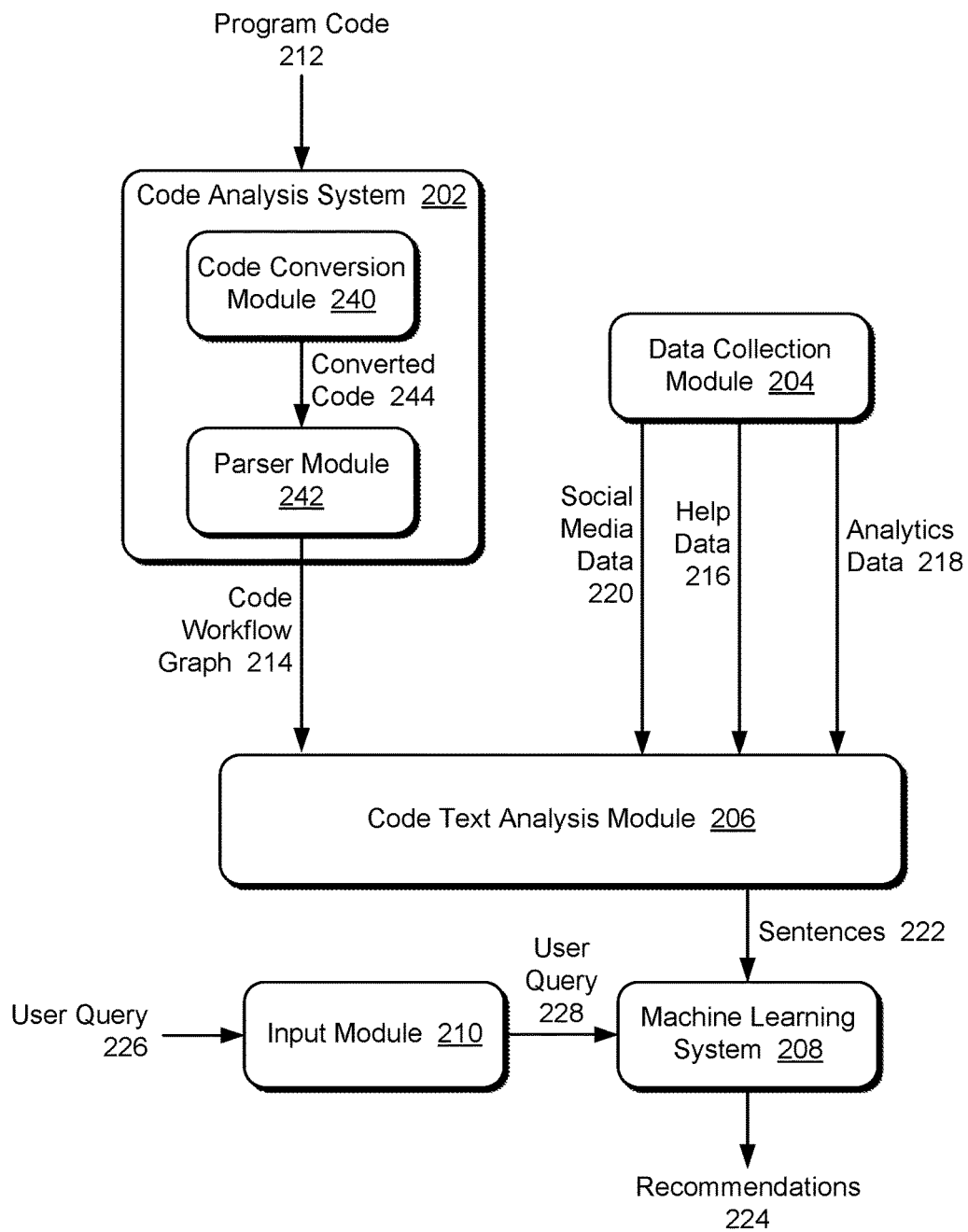
FIG. 2 is an illustration of an example architecture of a context-based recommendation system.

FIG. 2 is an illustration of an example architecture of a context-based recommendation system 104. The context-based recommendation system 104 includes a code analysis system 202, a data collection module 204, a code text analysis module 206, a machine learning system 208, and an input module 210.

Generally, the code analysis system 202 receives program code 212 of the feature-rich system 106 and generates a code workflow graph 214 describing workflows in the program code 212. The data collection module 204 obtains various data corresponding to the feature-rich system 106, such as help data 216, analytics data 218, social media data 220, and so forth. The code text analysis module 206 receives and analyzes the code workflow graph 214 and the data 216, 218, and 220 to identify sentences 222 in the workflow. The sentences 222 are input to and used to train machine learning system 208 to generate one or more recommendations 224. The input module 210 receives user input in the form of a user query 226, which is provide to the machine learning system 208 as user query 228. The machine learning system 208 generates and outputs as recommendations 224 workflows identified based on the user query 228.

More specifically, the feature-rich system 106 includes program code 212, also referred to as a code base. For example, the feature-rich system 106 can be a computer program and program code 212 can be source code for the computer program. The code analysis system 202 includes a code conversion module 240 and a parser module 242. The code analysis system 202 obtains the program code 212 and identifies workflows for the feature-rich system 106 from the program code 212. The code conversion module 240 receives the program code 212 and converts the program code 212 into a format that can be parsed to generate a workflow graph. The code conversion module 240 outputs the converted code 244 to the parser module 242. The code conversion module 240 can convert the program code 212 into a variety of different formats, such as an abstract syntax tree (AST) format or a JavaScript Object Notation (JSON) format.

The parser module 242 receives the converted code 244 and generates the code workflow graph 214. The code workflow graph 214 is a directed graph of associated workflows in the program code 212. The parser module 242 can generate the code workflow graph 214 using any of a variety of public or proprietary techniques. The code workflow graph 214 is also referred to as an unrefined graph, which is later refined to determine relevant and related features. Each node of the code workflow graph 214 identifies operations performed (e.g., functions or methods invoked by another function or method, functions or methods invoked in response to detecting or identifying a command, etc.) in the program code.

Figure 3:
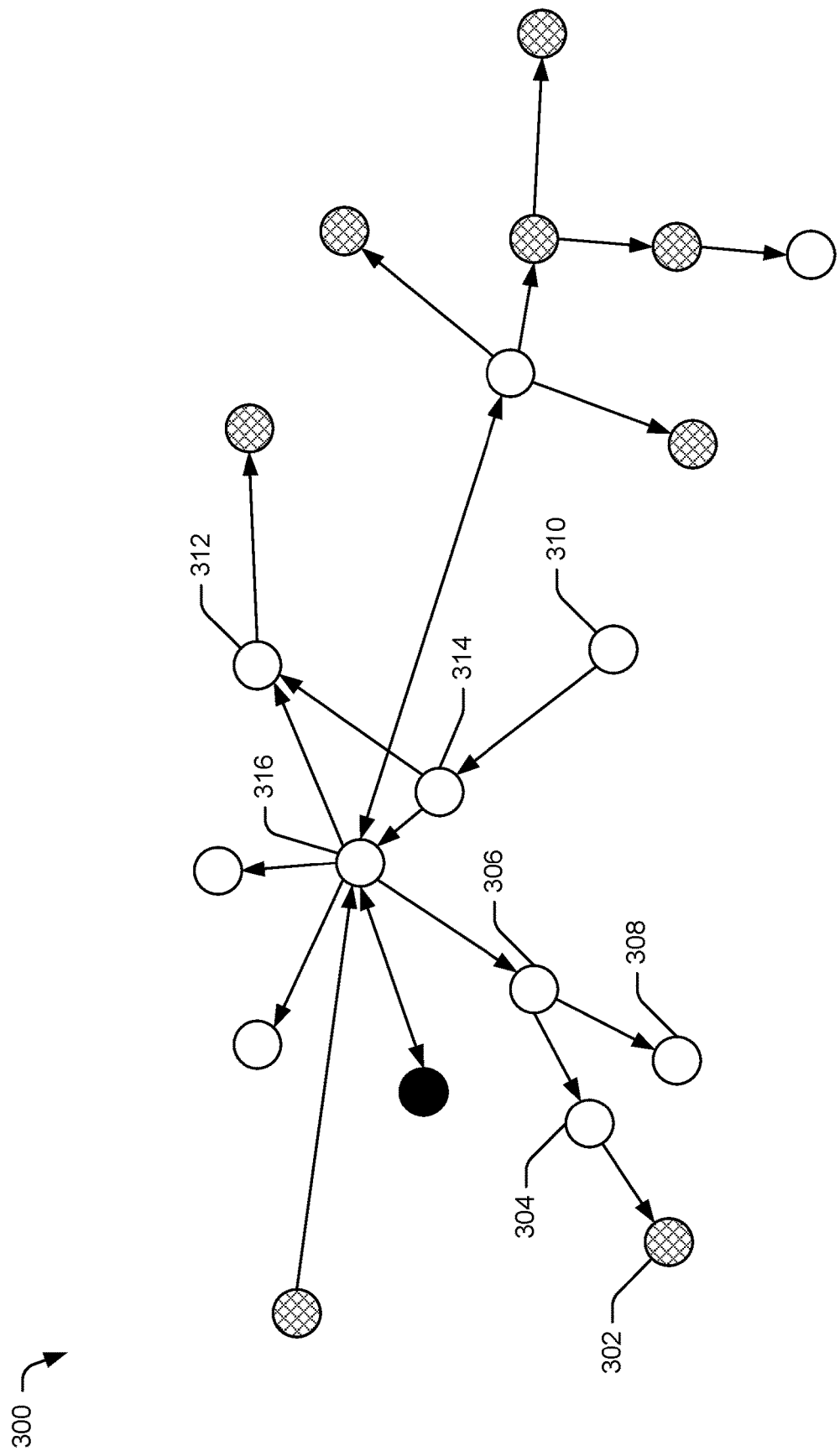
FIG. 3 illustrates an example code workflow graph.

FIG. 3 illustrates an example code workflow graph 300. The code workflow graph 300 includes multiple nodes, illustrated as circles, each representing a function or method in the program code 212 that is invoked by another function or method. The lines between nodes indicate which functions or methods invoke which other functions or methods. The arrows on the lines indicate which node called or invoked which other node. For example, the line with an arrow pointing to node 302 indicates that the function or method associated with node 304 called or invoked the function or method associated with node 302.

Each node has an associated tag that is the name of the function or method. For example, node 302 may have a tag of "SessionQuery," node 304 may have a tag of "VideoFeatures_fileSupportsAdjustments," node 306 may have a tag of "GetSnapsForImage," and node 308 may have a tag of "Image_getMasterImage." As can be seen from the graph 300, the function or method associated with node 306 ("GetSnapsForImage") invokes the function or method associated with node 308 ("Image_getMasterImage").

The program code 212 can be organized into multiple modules. Each node is also labeled with the module of the program code 212 that includes the function or method. This is illustrated in the graph 300 with different fills. White fill of a node indicates one module, cross-hatched fill indicates another module, and black fill indicates yet another module.

Returning to FIG. 2, the parser module 242 also identifies features of the program code 212 and associates those features with workflows in the code workflow graph 214. The parser module 242 can identify features by identifying strings (e.g., in the function or method names) in the program code 212 that are associated with the user interface (UI). For example, the naming convention used by the program code 212 may be to include "UI" in the name of each UI element (e.g., each function or method that receives user input for) a feature, allowing UI elements to be identified. Each UI element also has an associated string describing the feature (e.g., face detection, exposure control, etc.). The UI element issues a command to perform the feature, and this command has an associated identifier (a feature ID). The UI element can issue the command in various manners, such as by invoking one or more functions or methods, issuing a command via a communication channel that various modules listen to, and so forth. One or more functions or methods receive the command and in turn can invoke various other functions or methods, resulting in the workflow for the feature. These functions or methods in the workflow also include the feature ID, allowing the workflow associated with a particular feature to be readily identified.

The data collection module 204 obtains various data for use by the code text analysis module 206. In one or more implementations, the data collection module 204 obtains help data 216, analytics data 218, and social media data 220. The help data 216 refers to help data for the feature-rich system 106, typically provided by the developer of the feature-rich system 106. For example, the help data 216 can include data files that contain descriptions of the various features of the feature-rich system 106. The data collection module 204 can obtain the help data 216 from various sources, such as help files on the computing device 102, help pages included in the feature-rich system 106, a remote service (e.g., via the network 116), and so forth.

The analytics data 218 refers to data regarding usage of systems of the same type as the feature-rich system 106. This usage data includes, for example, the frequency of use of individual features of those systems, the duration of use of individual features of those systems, the order in which features are used, and so forth. The data collection module 204 can obtain the analytics data 218 from, for example, a remote service (e.g., via the network 116).

The social media data 220 refers to data obtained from various social media services, such as blogs dedicated to the same type of system as the feature-rich system 106 (e.g., photography blogs if the feature-rich system 106 is a photo processing system). The data collection module 204 can obtain content from multiple different social media services and generate as the social media data 220 a database or record of synonyms for various different features of those systems (e.g., various synonyms for similar features obtained from multiple different social media services). For example, the data collection module 204 can determine that photography blogs use the synonyms "exposure," "lighten," and "brighten" when referring to changing the exposure level when editing photographs. Given the social media source, these synonyms are generic in nature rather than being specific to the feature-rich system 106.

Additionally or alternatively, the data collection module 204 can collect different data. For example, the data collection module 204 need not collect all of help data 216, analytics data 218, and social media data 220 (e.g., may not collect social media data 220). By way of another example, the data collection module 204 can collect additional information for provision to the code text analysis module 206, such as marketing data (e.g., web pages or brochures describing features of the feature-rich system 106).

The code text analysis module 206 receives the code workflow graph 214, help data 216, analytics data 218, and social media data 220. The code text analysis module 206 generates sentences 222 based on the code workflow graph 214 and the data received from the data collection module 204. A sentence refers to a sequence of terms, also referred to as tokens, included in the functions or methods of a workflow. Each function or method can include multiple tokens. For example, a function name may be "AutoToneKeysForSettings," which includes the tokens "Auto," "Tone," "Keys," "For," and "Settings". The sentences 222 are sentences that are deemed important, which refers to sentences that include useful tokens for describing the functionality of a workflow corresponding to a feature of the feature-rich system 106.

Figure 4:
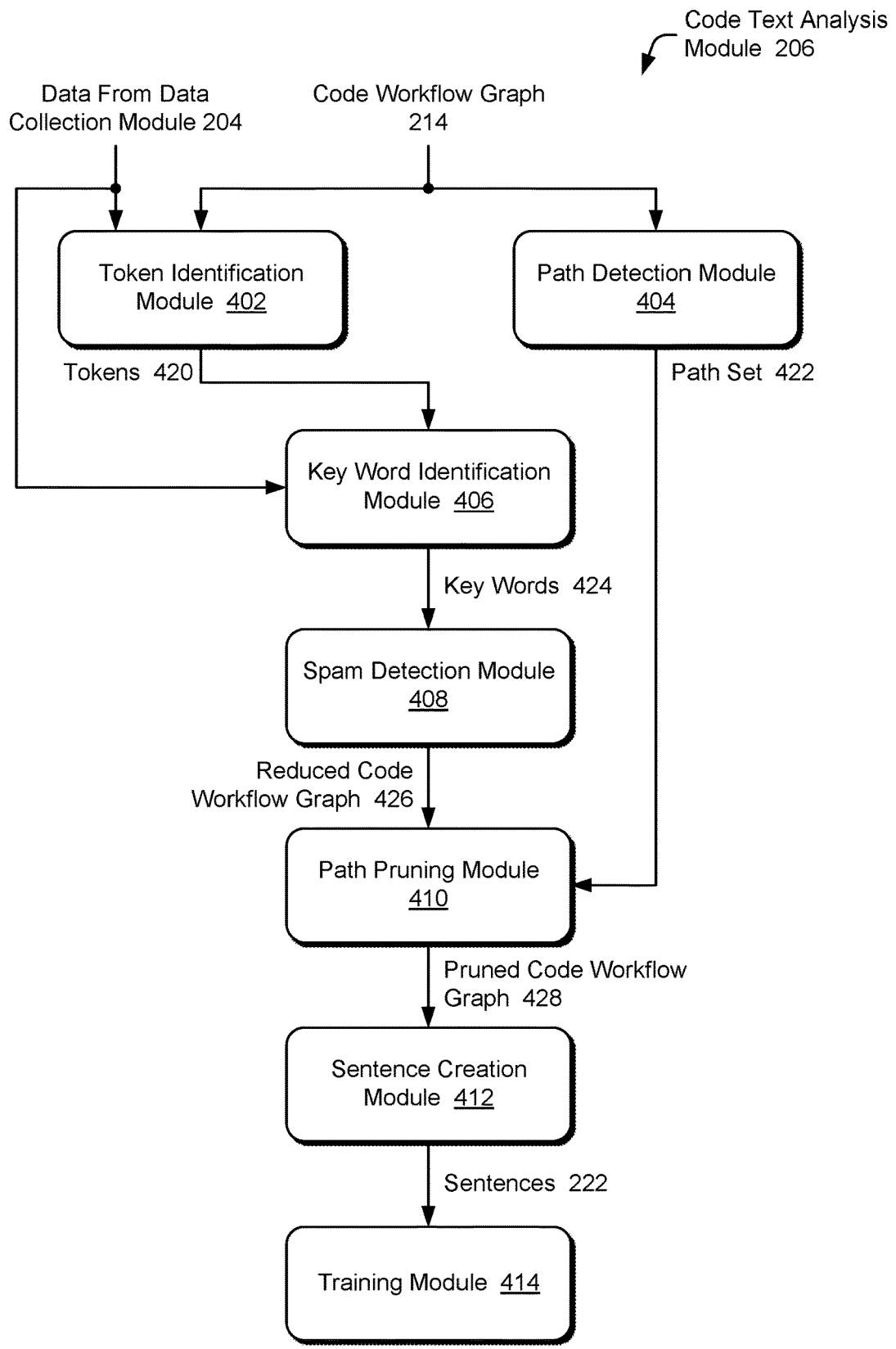
FIG. 4 illustrates an example implementation of the code text analysis module.

FIG. 4 illustrates an example implementation of the code text analysis module 206. The code text analysis module 206 includes a token identification module 402, a path detection module 404, a key word identification module 406, a spam detection module 408, a path pruning module 410, a sentence creation module 412, and a training module 414.

The token identification module 402 implements functionality to separate, for each node in the code workflow graph 214, the associated tag into one or more tokens. The tokens for a tag are also associated with the same node as the tag. The tokens can be stored in various different manners, such as, for each node in the code workflow graph 214, in a data structure corresponding to the node, in a separate token record, and so forth. In one or more implementations, the tokens are provided to the key word identification module 406 as tokens 420. Additionally or alternatively, the tokens can be stored with the code workflow graph 214 and the key word identification module 406 can obtain the tokens from the code workflow graph 214.

Each word in a tag (e.g., each portion of the tag that comprises a word) is a token of the tag. Other character sequences can also be tags, such as a commonly found character sequence (e.g., "AG") in the tags. Any of a variety of public or proprietary techniques can be used to generate the tokens, such as identifying words from dictionaries, identifying character sequences that begin with a capital letter and end at the character before the next capital letter or end at a punctuation mark, and so forth.

In one or more implementations, the token identification module 402 uses the data from the data collection module 204 to generate the tokens. Situations can arise in which multiple tokens that can be treated separately are combined into a single token. The data from the data collection module 204, such as the analytics data 218, can be used to determine when to combine the single token. If the combination of the tokens is a word or phrase that occurs commonly or at least a threshold number of times in the data from the data collection module 204, then the tokens are combined. For example, "AutoToneKeysForSettings" can include the token "Auto" and the token "Tone." However, if "AutoTone" is a word or phrase that is commonly used in blogs or other social media, the token identification module 402 combines the tokens and includes in the token record 422 "AutoTone" as a token for "AutoToneKeysForSettings" rather than including "Auto" and "Tone" as tokens for "AutoToneKeysForSettings."

The path detection module 404 implements functionality to generate a set of paths 422 through the code workflow graph 214. Each path corresponds to two or more nodes connected by one or more lines. For example, in FIG. 3 one path is from node 306 to node 304 to node 302, and another path is from node 306 to node 308. Any of various public or proprietary path detection techniques can be used to generate the path set 422.

The key word identification module 406 implements functionality to identify key words 424 in the tokens associated with the nodes of the code workflow graph 214. The key word identification module 406 identifies these key words based on the data from data collection module 204. The data from data collection module 204 includes analytics data 218, which identifies features of the feature-rich system 106. The key word identification module 406 includes, as key words 424, the tokens that match (e.g., are the same as) the words for these features in the analytics data 218.

Additionally or alternatively, the key word identification module 406 can identify key words in the tokens in other manners. For example, words commonly found in the data from data collection module 204 can be included as key words 424. Any of a variety of public or proprietary techniques can be used to determine which words are commonly found in the data from data collection module 204. For example, words that occur at least a threshold number of times (e.g., 20 or 30) in the data can be determined to be key words, the words that occur most frequently in the data (e.g., the top 25% of occurrences among all words in the data) can be determined to be key words, and so forth.

The spam detection module 408 implements functionality to remove tokens that are deemed to be unnecessary (also referred to as spam) from the code workflow graph 214. Generally, if a token is occurring many times in the code workflow graph 214 then that token is deemed to be unnecessary because it is too common in the code workflow graph 214 to provide useful information when satisfying a user query. In one or more implementations, the spam detection module 408 generates a term frequency-inverse document frequency (TF-IDF) score for each token in the code workflow graph 214 as follows:

$$TF - IDF \text{ Score} = TF_{x,y} * \log \frac{N}{df}$$

where $TF_{x,y}$ refers to the frequency of token X in the workflow Y, N refers to the total number of workflows in the code workflow graph 214, and df refers to the number of workflows in the code workflow graph 214 containing token X. Higher TF-IDF scores indicate tokens that are rarer in the code workflow graph 214 and lower TF-IDF scores indicate tokens that are more common in the code workflow graph 214.

The spam detection module 408 selects words to remove from the code workflow graph 214, resulting in a reduced code workflow graph 426. For example, a function name may be "AutoToneKeysForSettings" and have the associated tokens "AutoTone," "Keys," "For," and "Settings". The spam detection module 408 may determine that the token "For" is unnecessary because of its frequency in the code workflow graph 214 and delete the token "For" from all workflows in the code workflow graph 214.

The spam detection module 408 can determine whether a token is unnecessary based on the TF-IDF scores in various different manners. In one or more implementations, the spam detection module 408 determines that any token having at least a threshold score is to be included in the reduced code workflow graph 426 and tokens having lower scores are unnecessary. This threshold score can be a fixed value (e.g., 0.6) or a value that varies based on the code workflow graph 214 (e.g., the top 5% of scores). Additionally or alternatively, the spam detection module 408 can determine that tokens having a particular number of highest scores are to be included in the reduced code workflow graph 426 and tokens having lower scores are unnecessary. This particular number of highest scores can be a fixed value (e.g., 20 scores) or a value that varies based on the code workflow graph 214 (e.g., the top 5% of scores).

Additionally or alternatively, the spam detection module 408 can use key words 424 to determine whether a token is unnecessary. For example, the spam detection module 408 can determine that a token is unnecessary if the token is not included in the key words 424.

The path pruning module 410 implements functionality to remove paths from the reduced code workflow graph 426, resulting in a pruned code workflow graph 428. Generally, certain paths are deemed to be more useful in searching for features than other paths, and the path pruning module 410 operates to remove paths deemed to be less useful in searching for features. The path pruning module 410 can use various different techniques to remove paths from the reduced code workflow graph 426, also referred to as pruning the reduced code workflow graph 426. The path pruning module 410 provides to the sentence creation module 412 a pruned code workflow graph 428 that is the code workflow graph resulting from removing paths from the reduced code workflow graph 426.

In one or more implementations, the path pruning module 410 assigns a path weightage to each path and removes paths based on their path weightage. The path weightage of a given path refers to how many other paths in the reduced code workflow graph 426 include that given path. The path pruning module 410 removes a path if, for example, the path weightage of the path is not greater than a threshold amount. This threshold amount can be a fixed value (e.g., 5) or a value that varies based on the reduced code workflow graph 426 (e.g., the top 60% of path weightages for the reduced code workflow graph 426).

Additionally or alternatively, the path pruning module 410 identifies whether the path is asynchronous in nature. For example, whether the path is formed by making an asynchronous function or method call. In such situations the parser module 242 identifies whether each function or method invoked is invoked via an asynchronous call and associates an indication of such with each node in the code workflow graph 214. In one or more implementations, the path pruning module 410 removes paths that are asynchronous in nature.

Additionally or alternatively, the path pruning module 410 identifies whether the path includes nodes associated with different modules of the feature-rich system 106. As discussed above, the code workflow graph 214 (and thus the reduced code workflow graph 426) includes an indication of which modules the nodes of the path are in. In one or more implementations, the path pruning module 410 removes paths that include nodes in two or more different modules.

The sentence creation module 412 implements functionality to generate sentences from the pruned code workflow graph 428. The sentence creation module 412 identifies subgraphs in the pruned code workflow graph 428 within a particular radius of a given node. This particular radius can be measured in tokens (e.g., the particular radius may be 20-30 tokens). The sentence creation module 412 can select nodes from which to identify a subgraph in a variety of different manners. In one or more implementations, the sentence creation module 412 selects a node having the largest number of connections (lines to other nodes) and generates a subgraph to include the nodes that are within the particular radius of the selected node. It should be noted that multiple tokens can be associated with each node so that although the radius may be measured in tokens the number of nodes in the subgraph can be less than the number of tokens (e.g., the radius may be 25 tokens but the number of nodes may be 6).

The radius is measured by counting the number of tokens included in the paths. By way of example, referring again to FIG. 3, assume that the node 302 has associated tokens "Session" and "Query," the node 304 has associated tokens "Video," "Features," "Supports," and "Adjustments," the node 306 has associated tokens "Snaps" and "Images," and the node 308 has associated tokens "Master" and "Image." The number of tokens in the path from node 306 to node 304 to node 302 is eight, so node 302 is within 20-30 terms of node 306. Similarly, the number of tokens in the path from node 306 to node 308 is four, so node 308 is within 20-30 terms of node 306.

Once included in a subgraph, a node is excluded from inclusion in an additional subgraph. The sentence creation module 412 then selects a remaining node having the largest number of connections (lines to other nodes) and generates another subgraph to include the nodes that are within the particular radius of the selected node. This process is repeated, resulting in multiple subgraphs. This process can be repeated until various conditions are satisfied, such as a threshold number of subgraphs (e.g., 30 or 40) have been created, a threshold number of nodes (e.g., 90% of the nodes in the pruned code workflow graph 428) have been included in subgraphs, and so forth.

The sentence creation module 412 then generates, for each subgraph, sentences by generating a sequence of tokens that are associated with nodes along a path. The tokens are arranged in a sequence that is the same as the path, and for multiple tokens associated with a node the tokens are arranged in a sequence corresponding to the tag associated with the node. This sentence generation is performed for each path in the subgraph. It should be noted that situations can arise in which multiple paths exist between two nodes. In such situations, the sentence creation module 412 keeps the sentence corresponding to the shortest path between the two nodes, and deletes the sentences corresponding to other paths between the two nodes. In order to identify the shortest path between two nodes any of a variety of different distance determination techniques can be performed, such as Dijkstra's algorithm.

For example, referring again to FIG. 3 assume that node 310 has a tag of "DevelopOperationsHub" and associated tokens "Develop" and "Operations," that node 312 has a tag of "getEntitybyID" and associated tokens "Entity" and "ID," that node 314 has a tag of "ImageDoesNotSupportDevelop" and associated tokens "Image," "Support," and "Develop," and that node 316 has a tag of "HistoryNameForSettings" and associated tokens "History," "Name," and "Settings." There are two paths from node 310 to 312, path A that is node 310 to node 314 to node 312, and path B that is node 310 to node 314 to node 316 to node 312. The sentence creation module 412 generates for path A the sentence "Develop Operations Image Support Develop Entity ID" and for path B the sentence "Develop Operations Image Support Develop History Name Settings Entity ID." The sentence creation module 412 identifies that there are multiple paths between nodes 310 and 312 and keeps the sentence for the shortest path (path A) but deletes the sentence for the other path (path B).

Identifying sentences from subgraphs centered around a particular node with a large number of connections allows numerous paths that pass through that particular node to be identified. Accordingly, workflows that include those paths and correspond to different features are more likely to be co-related and relevant to a user query.

The sentence creation module 412 provides the sentences to the training module 414, which implements functionality to train the machine learning system 208. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth. For example, the machine learning system 208 can be implemented as a recurrent neural network, such as a Long Short Term Memory (LSTM) network or a Bi-directional Long Short Term Memory (Bi-LSTM) network.

The training module 414 uses the sentences 222 to train the machine learning system 208 to predict words that will follow a set of other words. or predict what sentences are close to a user query. As discussed above, by identifying sentences from subgraphs centered around a particular node, these sentences close to a user query are more likely to be identified by the machine learning system 208.

Returning to FIG. 2, after the machine learning system 208 is trained the input module 210 receives a user query 226. The input module 210 can receive the user query in any of a variety of manners, such as input of text to a text box, audio input, and so forth. The input module 210 provides the received user query as user query 228 to the machine learning system 208. The machine learning system 208 predicts what sentences are close to the context which the user has provided in the user query 226, and outputs those sentences as recommendations 224.

The machine learning system 208 predicts a probability of each of the workflows (e.g., based on the sentences of the workflow paths) being the answer to the user query 228. The machine learning system 208 outputs as recommendations 224, for each of one or more workflows, the sentence corresponding to the workflow. The number of recommendations output by the machine learning system 208 can be determined in various manners, such as a fixed number of recommendations (e.g., the three or five recommendations having the highest probabilities) or a variable number of recommendations (e.g., all recommendations having at least a threshold probability, such as 80%, of being the answer to the user query 228).

In one or more implementations, a further user input selecting one of the recommendations 224 can be received. The sentences corresponding to the workflows, as well as the associated features, are maintained in the code text analysis module 206. In response to user selection of one of the recommendations 224, the associated workflow and feature can be readily identified (e.g., by the input module 210) and the feature-rich system 106 directed to take the appropriate action, such as take the user to the feature (e.g., a tool of the feature-rich system 106 to allow the user to implement the feature) or display a help description for the feature.

It should be noted that by training the machine learning system 208 based on the program code 212 and the data collected by the data collection module, the context-based recommendation system 104 is customized to the particular context of the feature-rich system 106. This context is defined by the program code 212 as well as the various data collected by the data collection module 204. For example, if the feature-rich system 106 is a photo editing system, then the feature-rich system 106 is within a photography domain and the context-based recommendation system 104 is customized to the photography domain (e.g., in addition to being based on the program code 212, the context-based recommendation system 104 is customized based on photography blogs, analytics data for photo editing systems).

It should also be noted that the context-based recommendation system 104 can continue to learn over time. The machine learning system 208 can be re-trained at various times, such as at particular intervals (e.g., monthly), in response to certain events (e.g., changes in the program code 212, a new photography blog becoming available), and so forth. This allows changes in the data collected by the data collection module 204 over time (e.g., changes in features people are discussing on social media) to be incorporated into the context-based recommendation system 104.

Furthermore, in one or more implementations most of the context-based recommendation system 104 (e.g., the modules and machine learning system of FIG. 2 except for the input module 210) can be trained by a system or service (e.g., in the cloud). The trained machine learning system 208 and a mapping of sentences to features and workflows are provided the computing device 102. Thus, the context-based recommendation system 104 on the computing device 102 need only include the machine learning system 208, the mapping of sentences to features and workflows, and the input module 210. The machine learning system 208 and mapping of sentences to features and workflows can be updated by the system or service at a later time and the updated machine learning system 208 and mapping of sentences to features and workflows subsequently provided to the computing device 102.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-4.

Figure 5:
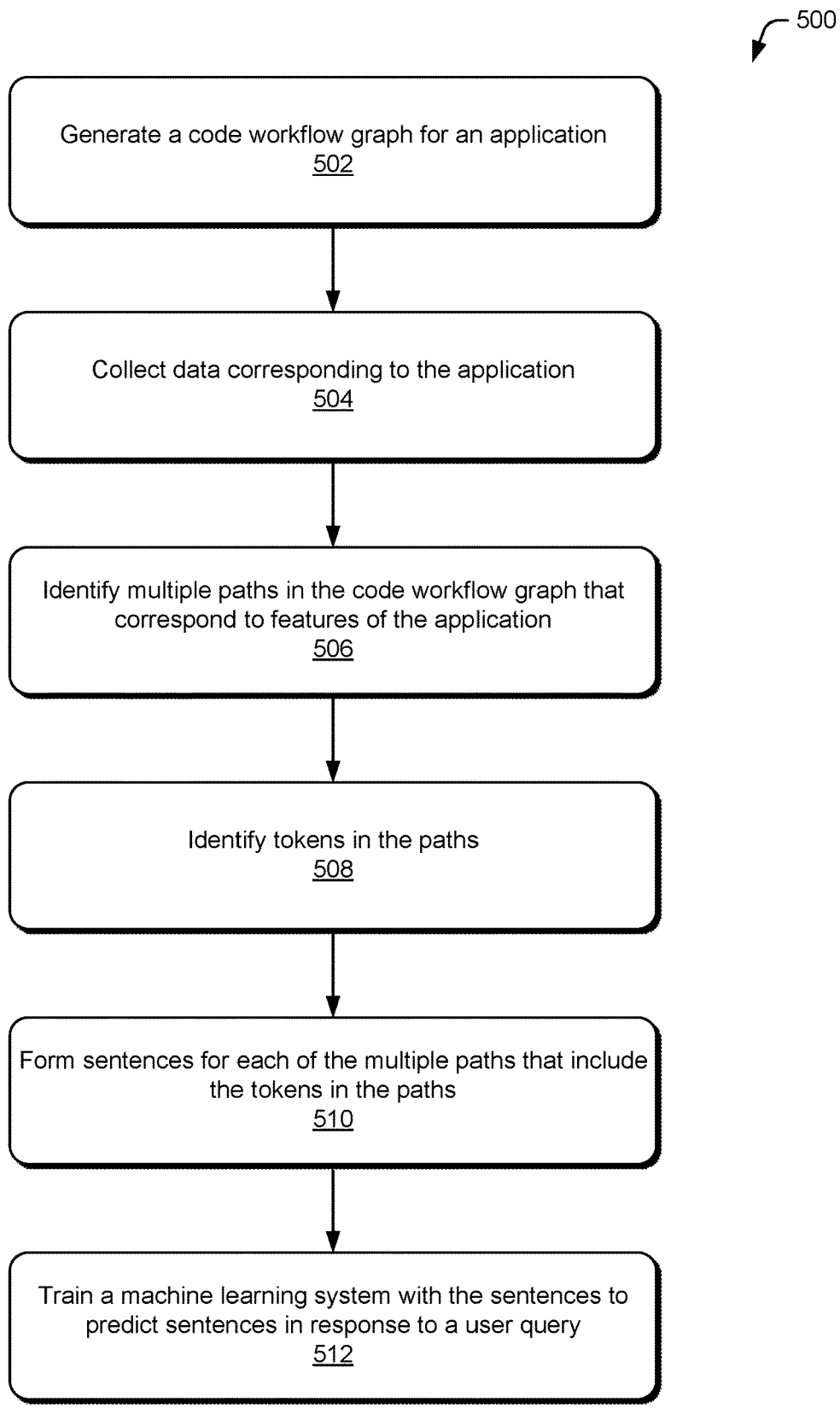
FIG. 5 is a flow diagram depicting a procedure in an example implementation of context-based recommendation system for feature search.

FIG. 5 is a flow diagram depicting a procedure in an example 300 implementation of context-based recommendation system for feature search. In this example, a code workflow graph is generated for an application (block 502). The code workflow graph includes multiple nodes each corresponding to a different function or method in the application, and each of the multiple nodes has an associated tag that is a name of the function or method.

Data corresponding to the application is collected (block 504). This data can include, for example, social media data, help data, analytics data, and so forth.

Multiple paths in the code workflow graph that correspond to features of the application are identified (block 506). Each of the multiple paths include two or more nodes of the multiple nodes.

Tokens in the path are identified (block 508). The tokens are identified based at least in part on the data. The tokens are terms included in the tags associated with the nodes in the paths.

Sentences are formed for each of the multiple paths (block 510). The sentence for a path includes the tokens in the path in an order in which the tokens occur in the path.

A machine learning system is trained with the sentences to predict sentences in response to a user query (block 512). The machine learning system can be any of a variety of machine learning systems, such as a LSTM or a Bi-LSTM.

Example System and Device

Figure 6:
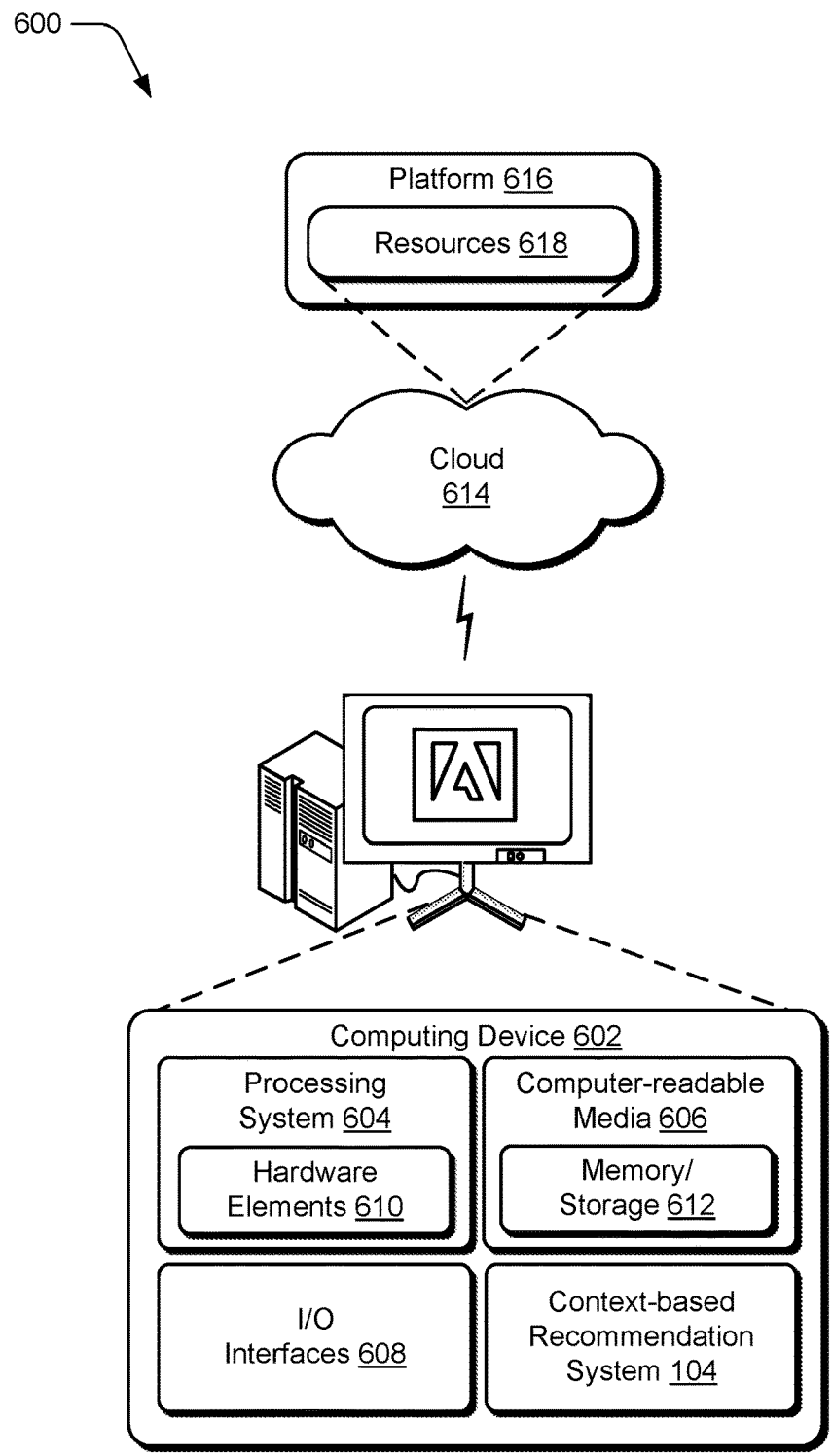
FIG. 6 illustrates an example system that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. This is illustrated through inclusion of the context-based recommendation system 104. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 604 is representative of functionality to perform one or more operations using hardware. Accordingly, processing system 604 is illustrated as including hardware elements 610 that may be configured as processors, functional blocks, and so forth. This may include implementation in hardware as an application specific integrated circuit or other logic device formed using one or more semiconductors. Hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. Memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to the computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of computing device 602 and are not limited to the specific examples of the techniques described herein. This functionality may also be implemented all or in part through use of a distributed system, such as over a "cloud" 620 via a platform 622 as described below.

Cloud 620 includes and/or is representative of a platform 622 for resources 624. Platform 622 abstracts underlying functionality of hardware (e.g., servers) and software resources of cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect computing device 602 with other computing devices. The platform 622 may also serve to abstract scaling of resources to provide a corresponding level of scale to encountered demand for resources 624 that are implemented via platform 622. Accordingly, in an interconnected device embodiment, implementation of functionality described herein may be distributed throughout system 600. For example, the functionality may be implemented in part on computing device 602 as well as via platform 622 that abstracts the functionality of the cloud 620.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by a computing device, the method comprising:
   generating a code workflow graph for an application, the code workflow graph including multiple nodes each corresponding to a different function or method in the application and having an associated tag that is a name of the function or method, connections between nodes indicating functions or methods in the application that invoke other functions or methods in the application;
   identifying multiple paths in the code workflow graph that correspond to features of the application, each of the multiple paths including two or more nodes of the multiple nodes that are connected in the code workflow graph;
   pruning, from the multiple paths, one or more paths between a first node and a second node of the code workflow graph that are not a shortest path between the first node and the second node, and at least one path having a path weightage that is less than a threshold, the path weightage indicating how many other paths of the multiple paths include the at least one path, the pruned paths being removed from the code workflow graph resulting in a pruned code workflow graph;
   identifying tokens in paths of the pruned code workflow graph, the tokens comprising terms included in the tags associated with the nodes in the paths, the identified tokens excluding the tokens that represent the terms in the tags that occur most frequently in the code workflow graph;

forming, for each of the paths of the pruned code workflow graph, a sentence that includes the identified tokens in the path in an order in which the tokens occur in the path; and using the sentences formed from the multiple paths as training data to train a machine learning system to predict which ones of the sentences formed from the paths of the pruned code workflow graph correspond to a user query received as input by the trained machine learning system.

2. The method of claim 1, wherein the forming comprises:

selecting a particular node of the pruned code workflow graph having a largest number of connections to other nodes in the pruned code workflow graph;

identifying a subgraph including the particular node and multiple additional nodes within a threshold radius of the particular node, the threshold radius comprising a threshold number of tokens such that there is less than or equal to the threshold number of tokens between the particular node and each additional node included in the subgraph, the subgraph excluding the tokens outside the threshold radius; and forming, for each path in the subgraph, a sentence that includes the tokens in the path in an order in which the tokens occur in the path.

3. The method of claim 1, further comprising collecting application data corresponding to the application, the application data including social media data, help data, and analytics data associated with the application, the tokens being identified based, at least in part, on the application data.

4. The method of claim 1, further comprising repeating, in response to the application changing to include an additional feature, the generating, the identifying the multiple paths, the pruning, the identifying the tokens, the forming, and the using the sentences as the training data.

5. The method of claim 3, further comprising repeating, after a defined time interval and based on changes in the application data during the defined time interval, the generating, the identifying the multiple paths, the pruning, the identifying the tokens, the forming, and the using the sentences as the training data.

6. The method of claim 1, further comprising:

receiving the user query;

identifying by the machine learning system, workflows that may satisfy the user query; and displaying the sentences corresponding to the workflows identified by the machine learning system.

7. In a content creation digital medium environment, a computing device comprising:

a processor; and computer-readable storage media having stored there on multiple instructions that, responsive to execution by the processor, cause the processor to perform operations including:

receiving a user query for help in an application;

identifying workflows in the application that may satisfy the user query, the identifying including using a machine learning system trained based on:

a code workflow graph for the application that includes a plurality of nodes each corresponding to a different function or method in the application, wherein connections between nodes indicate functions or methods in the application that invoke other functions or methods in the application, application data corresponding to the application, paths through the code workflow graph each including multiple nodes of the plurality of nodes that are connected in the code workflow graph, the paths having been pruned to remove one or more paths of a set of paths between a first node and a second node that are not a shortest path between the first node and the second node and to remove at least one path having a path weightage that is less than a threshold, the path weightage indicating how many other paths include the at least one path, and sentences that are made up of tokens in the paths, wherein the tokens are terms included in a function or method name corresponding to individual nodes of the code workflow graph; and displaying a set of sentences corresponding to the workflows identified by the machine learning system.

8. The computing device of claim 7, the operations further comprising:

receiving user selection of a first sentence of the set of sentences; and directing the application to take the user to a feature associated with the first sentence.

9. The computing device of claim 7, the operations further comprising:

receiving user selection of a first sentence of the set of sentences; and directing the application to display a help description for a feature associated with the first sentence.

10. The computing device of claim 7, wherein the application data includes social media data, help data associated with the application, and analytics data associated with the application.

11. A system comprising:

a code analysis system, implemented at least in part in hardware, to generate a code workflow graph for an application, the code workflow graph including multiple nodes each corresponding to a different function or method in the application and having an associated tag that is a name of the function or method, connections between nodes indicating functions or methods in the application that invoke other functions or methods in the application; and means for training a machine learning system to predict sentences corresponding to paths through the code workflow graph that each include two or more nodes of the multiple nodes that are connected in the code workflow graph, including means for pruning one or more paths between a first node and a second node of the code workflow graph that is not a shortest path between the first node and the second node and at least one path having a path weightage that is less than a threshold, wherein the path weightage indicates how many other paths through the code workflow graph include the at least one path, wherein the sentences are made up of tokens in the paths, and the tokens are terms included in a function or method name corresponding to individual nodes of the code workflow graph.

12. The system of claim 11, further comprising a data collection module, implemented at least in part in hardware, to collect social media data corresponding to the application, the means for training the machine learning system including means for identifying, based on the code workflow graph and the data corresponding to the application, the tokens.

13. The method of claim 1, wherein the associated tag for each respective node is a portion of program code of a computer program that implements the application.

14. The method of claim 13, wherein the application is a digital content creation application.

15. The method of claim 3, further comprising identifying key words that occur most frequently in the application data, the identified tokens further excluding the tokens that represent the terms that are not the key words.

16. The method of claim 1, further comprising combining two or more tokens to form one combined token responsive to determining that the two or more tokens occur together in the data at least a threshold number of times, at least one token in the pruned code workflow graph corresponding to the one combined token.

17. The method of claim 2, wherein the forming further comprises repeating the selecting the particular node, the identifying the subgraph, and the forming a sentence for each path in the subgraph until a threshold number of subgraphs have been identified, wherein each node of the code workflow graph that is included in a respective subgraph is excluded from each additional subgraph.

18. The system of claim 11, further comprising an input module, implemented at least in part in hardware, configured to:
    receive a user query;
    identify, using the machine learning system, workflows in the code workflow graph that may satisfy the user query; and
    display the sentences corresponding to the workflows identified by the machine learning system.

19. The method of claim 1, further comprising identifying a path of the multiple paths that includes an asynchronous function or method call, the pruning further including pruning the path that includes the asynchronous function or method call from the multiple paths.

20. The method of claim 1, wherein the functions or methods of the application are organized into a plurality of modules, and each node of the code workflow graph is assigned a respective module of the plurality of modules, the pruning further including pruning, from the multiple paths, paths that include multiple nodes assigned to different modules.

* * * * *